US009532584B2

(12) United States Patent  
Smith et al.

(10) Patent No.: US 9,532,584 B2
(45) Date of Patent: Jan. 3, 2017

(54) PROCESSED CHEESE WITHOUT EMULSIFYING SALTS

(71) Applicant: Kraft Foods Group Brands LLC, Northfield, IL (US)

(72) Inventors: Gary Francis Smith, Glenview, IL (US); Edwin Rivera, East Hanover, NJ (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 14/964,203

(22) Filed: Dec. 9, 2015

(65) Prior Publication Data

US 2016/0081362 A1     Mar. 24, 2016

Related U.S. Application Data

(62) Division of application No. 12/143,990, filed on Jun. 23, 2008, now Pat. No. 9,232,808.

(60) Provisional application No. 61/007,506, filed on Jun. 29, 2007.

(51) Int. Cl.
*A23C 19/00* (2006.01)
*A23C 19/08* (2006.01)

(52) U.S. Cl.
CPC ......... *A23C 19/08* (2013.01); *A23C 2250/054* (2013.01)

(58) Field of Classification Search
CPC ..................... A23C 19/08; A23C 2250/054
See application file for complete search history.

(56) References Cited

U.S. PATENT DOCUMENTS

| 1,945,345 | A | * | 1/1934 | Epstein | ............ | A23C 19/0925 |
| | | | | | | 426/534 |
| 2,778,171 | A | | 1/1957 | Taunton | | |
| 2,954,901 | A | | 10/1960 | Winstead | | |
| 2,991,001 | A | | 7/1961 | Hughes | | |
| 3,217,871 | A | | 5/1963 | Lee | | |
| 3,154,239 | A | | 10/1964 | Madsen | | |
| 3,608,707 | A | | 9/1971 | Miller | | |
| 3,616,898 | A | | 11/1971 | Massie | | |
| 3,653,502 | A | | 4/1972 | Beaudoin | | |
| 3,735,918 | A | | 5/1973 | Tundermann | | |
| 3,879,492 | A | | 4/1975 | Bontinick | | |
| 3,885,977 | A | | 5/1975 | Lachman | | |
| 4,058,645 | A | | 11/1977 | Steiner | | |
| 4,061,820 | A | | 12/1977 | Magid | | |
| 4,082,877 | A | | 4/1978 | Shadle | | |
| 4,112,131 | A | * | 9/1978 | Bosy | ............ | A23C 19/08 |
| | | | | | | 426/388 |
| 4,210,246 | A | | 7/1980 | Kuchenbecker | | |

| 4,337,862 | A | 7/1982 | Suter |
| 4,361,237 | A | 11/1982 | Heiremans |
| 4,367,312 | A | 1/1983 | Bontinck |
| 4,399,249 | A | 8/1983 | Bildusas |
| 4,488,647 | A | 12/1984 | Davis |
| 4,506,488 | A | 3/1985 | Matt |
| 4,512,479 | A | 4/1985 | Hain |
| 4,533,445 | A | 8/1985 | Orio |
| 4,533,509 | A | 8/1985 | Gust |
| 4,552,774 | A | 11/1985 | Gronfor |
| 4,556,595 | A | 12/1985 | Ochi |
| 4,572,377 | A | 2/1986 | Beckett |
| 4,576,854 | A | 3/1986 | Kurahashi |
| 4,617,223 | A | 10/1986 | Hiscock |
| 4,623,398 | A | 11/1986 | Goodman |
| 4,661,099 | A | 4/1987 | vonBittera |
| 4,674,634 | A | 6/1987 | Wilson |
| 4,676,394 | A | 6/1987 | Hiersteiner |
| 4,696,849 | A | 9/1987 | Mobley |
| 4,705,174 | A | 11/1987 | Goglio |
| 4,709,396 | A | 11/1987 | Voshall |
| 4,709,397 | A | 11/1987 | Voshall |
| 4,728,572 | A | 3/1988 | Davis |
| 4,745,138 | A | 5/1988 | Thanawalla |
| 4,752,342 | A | 6/1988 | Tatum |
| 4,759,642 | A | 7/1988 | VanErden |
| 4,771,935 | A | 9/1988 | Hekal |
| 4,785,940 | A | 11/1988 | Wilson |
| 4,786,190 | A | 11/1988 | VanErden |

(Continued)

FOREIGN PATENT DOCUMENTS

| DE | 4410235 | 9/1995 |
| DE | 20113173 | 11/2001 |

(Continued)

OTHER PUBLICATIONS

Bentley, D.; About Cold Seal Adhesives, Paper, Film and Foil Converter, Jan. 1, 2006, Internet Printout.
Dow Introduces HYPOD Polyolefin Dispersions, Midland, Michigan, Jul. 11, 2007, [online]. Retrieved from the Internet: http://news.dow.com/prodbus/20070711b.htm.
European Patent Office, Notification of Transmittal of the International Search Report and the Written Opinion of the International Searching Authority for International Application No. PCT/US2009/042998 dated Aug. 6, 2009.
European Patent Office European Search Report and Written Opinion, dated Jan. 14, 2008; EP Application No. 07115566.7.
European Patent Office Extended European Search Report, dated Mar. 5, 2007; EP Application No. 06122144.6.

(Continued)

*Primary Examiner* — Katherine D Leblanc
(74) *Attorney, Agent, or Firm* — Fitch, Even, Tabin & Flannery LLP

(57) ABSTRACT

The present invention is directed to process cheese type products prepared with calcium-reduced ingredients but without emulsifying salts and methods of producing such process cheese type products without emulsifying salts. The process cheeses of the present invention are advantageously resistant to separation during heating and retain desirable organoleptic properties, such as texture, without using emulsifying salts. The process cheeses of the present invention are also lower in sodium than conventional produces cheese products.

14 Claims, No Drawings

(56) References Cited

U.S. PATENT DOCUMENTS

| | | |
|---|---|---|
| 4,791,024 A | 12/1988 | Clerici |
| 4,810,523 A | 3/1989 | Williams |
| 4,810,541 A | 3/1989 | Newman |
| 4,810,745 A | 3/1989 | Pike |
| 4,855,077 A | 8/1989 | Shikinami |
| 4,859,521 A | 8/1989 | Pike |
| 4,889,884 A | 12/1989 | Dust |
| 4,898,280 A | 2/1990 | Runge |
| 4,898,787 A | 2/1990 | Min |
| 4,901,505 A | 2/1990 | Williams, Jr. |
| 4,901,515 A | 2/1990 | McLeod |
| 4,902,142 A | 2/1990 | Lammert |
| 4,902,578 A | 2/1990 | Kerr, III |
| 4,931,327 A | 6/1990 | Liu |
| 4,946,728 A | 8/1990 | Ikeda |
| 4,970,113 A | 11/1990 | Yamada |
| 4,982,064 A | 1/1991 | Hartman |
| 5,007,143 A | 4/1991 | Herrington |
| 5,062,569 A | 11/1991 | Hekal |
| 5,064,660 A | 11/1991 | Silver |
| 5,064,717 A | 11/1991 | Suzuki |
| 5,073,457 A | 12/1991 | Blackwell |
| 5,089,320 A | 2/1992 | Straus |
| 5,134,001 A | 7/1992 | Osgood |
| 5,141,789 A | 8/1992 | Matsuzawa |
| 5,145,737 A | 9/1992 | Boiron |
| 5,151,318 A | 9/1992 | Strasilla |
| 5,173,344 A | 12/1992 | Hughes |
| 5,174,659 A | 12/1992 | Laske |
| 5,200,268 A | 4/1993 | Hamada |
| 5,234,730 A | 8/1993 | Lautenschlaeger |
| 5,248,715 A | 9/1993 | Gray |
| 5,286,781 A | 2/1994 | Gotoh |
| 5,290,842 A | 3/1994 | Sasaki |
| 5,308,666 A | 5/1994 | Borchardt |
| 5,334,643 A | 8/1994 | Gage |
| 5,352,466 A | 10/1994 | Delonis |
| 5,382,472 A | 1/1995 | Yanidis |
| 5,384,341 A | 1/1995 | Itagaki |
| 5,392,986 A | 2/1995 | Beer |
| 5,405,896 A | 4/1995 | Fujiki |
| 5,409,115 A | 4/1995 | Barkhorn |
| 5,413,829 A | 5/1995 | Brown |
| 5,437,911 A | 8/1995 | Rohrka |
| 5,449,552 A | 9/1995 | Bochow |
| 5,454,207 A | 10/1995 | Storandt |
| 5,460,844 A | 10/1995 | Gaylor |
| 5,473,016 A | 12/1995 | Fujii |
| 5,519,982 A | 5/1996 | Herber |
| 5,527,576 A | 6/1996 | Maul |
| 5,538,771 A | 7/1996 | Nakayama |
| 5,575,747 A | 11/1996 | Dais |
| 5,616,400 A | 4/1997 | Zhang |
| 5,619,058 A | 4/1997 | Kim |
| 5,626,929 A | 5/1997 | Stevenson |
| 5,634,969 A | 6/1997 | Cody |
| 5,639,811 A | 6/1997 | Plamthottam |
| 5,662,983 A | 9/1997 | Stark |
| 5,691,052 A | 11/1997 | Jones |
| 5,706,961 A | 1/1998 | Morano |
| 5,716,698 A | 2/1998 | Schreck |
| 5,725,312 A | 3/1998 | May |
| 5,733,652 A | 3/1998 | Stowman |
| 5,739,087 A | 4/1998 | Dennis |
| 5,747,560 A | 5/1998 | Christiani |
| 5,750,177 A | 5/1998 | Yee et al. |
| 5,773,136 A | 6/1998 | Alder |
| 5,780,376 A | 7/1998 | Gonzales |
| 5,792,549 A | 8/1998 | Wilkie |
| 5,792,812 A | 8/1998 | Fujiki |
| 5,795,834 A | 8/1998 | Deeb |
| 5,807,637 A | 9/1998 | Schumann |
| 5,814,382 A | 9/1998 | Yannuzzi, Jr. |
| 5,830,547 A | 11/1998 | MacKenzie |
| 5,863,977 A | 1/1999 | Fischer |
| 5,882,749 A | 3/1999 | Jones |
| 5,882,789 A | 3/1999 | Jones |
| 5,885,673 A | 3/1999 | Light |
| 5,912,084 A | 6/1999 | Hausmann |
| 5,924,795 A | 7/1999 | Thompson |
| 5,952,420 A | 9/1999 | Senkus |
| 5,958,531 A | 9/1999 | Stevenson |
| 5,972,448 A | 10/1999 | Frisk |
| 5,981,650 A | 11/1999 | Zhao |
| 5,993,962 A | 11/1999 | Timm |
| 5,997,968 A | 12/1999 | Dries |
| 6,006,913 A | 12/1999 | Ludemann |
| 6,012,844 A | 1/2000 | Huseman |
| 6,015,934 A | 1/2000 | Lee |
| 6,017,623 A | 1/2000 | Nakanishi |
| 6,022,612 A | 2/2000 | Wilkie |
| 6,034,163 A | 3/2000 | Barbee |
| 6,036,765 A | 3/2000 | Farrow |
| D423,346 S | 4/2000 | Froehlich |
| 6,084,010 A | 7/2000 | Baetzold |
| 6,096,387 A | 8/2000 | Decker |
| 6,099,682 A | 8/2000 | Krampe |
| 6,117,531 A | 9/2000 | Schacht |
| 6,129,983 A | 10/2000 | Schumann |
| 6,172,156 B1 | 1/2001 | Lindquist |
| 6,177,118 B1 | 1/2001 | Blazey et al. |
| 6,184,264 B1 | 2/2001 | Webster |
| 6,196,716 B1 | 3/2001 | Geyer |
| 6,199,698 B1 | 3/2001 | Hetrick |
| 6,200,677 B1 | 3/2001 | Richardson |
| 6,210,796 B1 | 4/2001 | Lobert |
| 6,210,826 B1 | 4/2001 | Dopp |
| 6,238,090 B1 | 5/2001 | Yuter |
| 6,244,748 B1 | 6/2001 | Kasai |
| 6,279,297 B1 | 8/2001 | Latronico |
| 6,287,658 B1 | 9/2001 | Cosentino |
| 6,296,961 B1 | 10/2001 | Moy |
| 6,312,828 B1 | 11/2001 | Akao |
| 6,318,894 B1 | 11/2001 | Derenthal |
| 6,331,336 B1 | 12/2001 | Szonn |
| 6,351,857 B2 | 3/2002 | Slaon, III |
| 6,355,732 B1 | 3/2002 | Beer |
| 6,358,576 B1 | 3/2002 | Adur |
| 6,358,622 B1 | 3/2002 | Shida |
| 6,359,052 B1 | 3/2002 | Trexler, Jr. |
| 6,371,644 B1 | 4/2002 | Forman |
| 6,372,268 B1 | 4/2002 | Silver et al. |
| 6,376,591 B1 | 4/2002 | Lan |
| 6,384,121 B1 | 5/2002 | Barbee |
| 6,388,006 B1 | 5/2002 | Fujita |
| 6,389,651 B2 | 5/2002 | Johnson |
| 6,398,412 B2 | 6/2002 | Wedi |
| 6,417,262 B1 | 7/2002 | Turner |
| 6,423,768 B1 | 7/2002 | Khouri |
| 6,429,235 B1 | 8/2002 | Varlemann |
| 6,436,571 B1 | 8/2002 | Passaniti |
| 6,440,481 B1 | 8/2002 | Gascoigne et al. |
| 6,444,742 B1 | 9/2002 | Rong |
| 6,451,398 B1 | 9/2002 | Sylvester |
| 6,451,426 B2 | 9/2002 | Kong |
| 6,461,044 B1 | 10/2002 | Anderson |
| 6,461,708 B1 | 10/2002 | Dronzek |
| 6,465,543 B1 | 10/2002 | Alexandre |
| 6,467,957 B2 | 10/2002 | Yeager |
| 6,485,826 B1 | 11/2002 | Watanabe |
| 6,486,253 B1 | 11/2002 | Gilmer |
| 6,499,878 B1 | 12/2002 | Dobreski |
| D470,757 S | 2/2003 | Espinel |
| 6,521,678 B1 | 2/2003 | Chaiko |
| 6,521,690 B1 | 2/2003 | Ross |
| 6,524,700 B2 | 2/2003 | Masuda |
| 6,541,098 B2 | 4/2003 | Venkatasanthanam |
| 6,548,587 B1 | 4/2003 | Bagrodia |
| 6,552,114 B2 | 4/2003 | Turner |
| 6,599,622 B1 | 7/2003 | Chu |
| 6,608,134 B1 | 8/2003 | Tobing |
| 6,613,831 B1 | 9/2003 | Bentley |
| 6,624,273 B1 | 9/2003 | Everaerts |
| 6,630,220 B1 | 10/2003 | Veiga |

(56) References Cited

U.S. PATENT DOCUMENTS

| | | |
|---|---|---|
| 6,632,522 B1 | 10/2003 | Hyde |
| 6,632,868 B2 | 10/2003 | Qian |
| 6,709,759 B2 | 3/2004 | Mueller |
| 6,713,152 B2 | 3/2004 | Chen |
| 6,713,547 B2 | 3/2004 | Barbee |
| 6,723,403 B2 | 4/2004 | Ishii |
| 6,723,407 B2 | 4/2004 | Dollase |
| 6,743,451 B2 | 6/2004 | Rasile |
| 6,767,951 B2 | 7/2004 | Nair |
| 6,770,697 B2 | 8/2004 | Drewniak |
| 6,777,490 B2 | 8/2004 | Mussig |
| 6,787,592 B1 | 9/2004 | Powell |
| 6,815,025 B2 | 11/2004 | Kawamura |
| 6,820,546 B2 | 11/2004 | Wynne |
| 6,831,123 B1 | 12/2004 | Chisholm |
| 6,838,150 B2 | 1/2005 | Mazurek |
| 6,838,508 B2 | 1/2005 | Hsiao |
| 6,841,241 B2 | 1/2005 | Luhmann |
| 6,844,079 B2 | 1/2005 | Holzer |
| 6,849,313 B2 | 2/2005 | Mechelaere |
| 6,852,422 B2 | 2/2005 | Kendall |
| 6,863,646 B2 | 3/2005 | Kinigakis |
| 6,884,207 B2 | 4/2005 | Pokusa |
| 6,896,956 B2 | 5/2005 | Kong |
| 6,902,750 B2 | 6/2005 | Eckert et al. |
| 6,913,809 B2 | 7/2005 | Wolak |
| 6,929,400 B2 | 8/2005 | Razeti |
| 6,979,379 B2 | 12/2005 | White, II |
| 6,991,375 B2 | 1/2006 | Clune |
| 7,135,508 B2 | 11/2006 | Chaiko |
| 7,141,293 B2 | 11/2006 | Peiffer |
| 7,157,108 B2 | 1/2007 | Bhaskar et al. |
| 7,157,516 B2 | 1/2007 | Chaiko |
| 7,163,720 B1 | 1/2007 | Dhaler |
| 7,165,888 B2 | 1/2007 | Rodick |
| 7,166,656 B2 | 1/2007 | Majumdar |
| 7,186,452 B2 | 3/2007 | Peiffer |
| 7,189,781 B2 | 3/2007 | Acevedo |
| 7,192,619 B2 | 3/2007 | Dybing et al. |
| 7,205,040 B2 | 4/2007 | Peiffer |
| D541,667 S | 5/2007 | Pokusa |
| D541,668 S | 5/2007 | Pokusa |
| D541,669 S | 5/2007 | Pokusa |
| 7,211,306 B2 | 5/2007 | Peiffer |
| 7,211,613 B2 | 5/2007 | Lorah |
| 7,244,223 B2 | 7/2007 | Hartman |
| 7,267,858 B2 | 9/2007 | Ono |
| 7,268,173 B2 | 9/2007 | Graichen |
| 7,329,439 B2 | 2/2008 | Sachdev |
| 7,329,453 B2 | 2/2008 | Peiffer |
| 7,351,470 B2 | 4/2008 | Draheim |
| 7,354,635 B2 | 4/2008 | Malfait |
| 7,368,165 B2 | 5/2008 | Sankey |
| 7,368,496 B2 | 5/2008 | Kim |
| 7,371,793 B2 | 5/2008 | Gong |
| 7,393,581 B2 | 7/2008 | Kim |
| 7,396,578 B2 | 7/2008 | Peiffer |
| 7,399,263 B2 | 7/2008 | Hartman |
| 7,413,800 B2 | 8/2008 | Wood, Jr. |
| 7,491,434 B2 | 2/2009 | Khandpur |
| 7,495,051 B2 | 2/2009 | Nelson |
| 7,740,923 B2 | 6/2010 | Exner |
| 7,892,391 B2 | 2/2011 | Kendig |
| 8,389,596 B2 | 3/2013 | Boyce |
| 2001/0012557 A1 | 8/2001 | Willham |
| 2001/0019765 A1 | 9/2001 | Kiuchi |
| 2001/0021451 A1 | 9/2001 | Tokunaga |
| 2001/0035593 A1 | 11/2001 | Peiffer |
| 2001/0039302 A1 | 11/2001 | Wustling |
| 2001/0049414 A1 | 12/2001 | Muller |
| 2001/0055679 A1 | 12/2001 | Schumann |
| 2002/0009563 A1 | 1/2002 | Kawamura |
| 2002/0028335 A1 | 3/2002 | Fujiki |
| 2002/0058739 A1 | 5/2002 | Lorah |
| 2002/0098347 A1 | 7/2002 | Szonn |
| 2002/0114948 A1 | 8/2002 | Schumann |
| 2002/0122977 A1 | 9/2002 | Fujimatsu |
| 2002/0137834 A1 | 9/2002 | Barbee |
| 2002/0150729 A1 | 10/2002 | Mueller |
| 2002/0160037 A1 | 10/2002 | Ahrens |
| 2002/0165306 A1 | 11/2002 | Gilmer |
| 2002/0193494 A1 | 12/2002 | Gilmer |
| 2003/0013796 A1 | 1/2003 | Turner |
| 2003/0032691 A1 | 2/2003 | Bolte |
| 2003/0054068 A1 | 3/2003 | Dybing et al. |
| 2003/0072957 A1 | 4/2003 | Lee |
| 2003/0082370 A1 | 5/2003 | Husemann |
| 2003/0091763 A1 | 5/2003 | Ferri |
| 2003/0096108 A1 | 5/2003 | Mussig |
| 2003/0100656 A1 | 5/2003 | Majumdar |
| 2003/0103690 A1 | 6/2003 | Schneider |
| 2003/0118759 A1 | 6/2003 | Yoshikawa |
| 2003/0130399 A1 | 7/2003 | Mehta |
| 2003/0138624 A1 | 7/2003 | Burmeister |
| 2003/0144398 A1 | 7/2003 | Cody |
| 2003/0152735 A1 | 8/2003 | Koike |
| 2003/0170357 A1 | 9/2003 | Garwood |
| 2003/0180530 A1 | 9/2003 | Otten |
| 2003/0209453 A1 | 11/2003 | Herman |
| 2003/0211308 A1 | 11/2003 | Khandpur |
| 2003/0219585 A1 | 11/2003 | Yamanaka |
| 2003/0219612 A1 | 11/2003 | Massey |
| 2003/0235664 A1 | 12/2003 | Merical |
| 2004/0007319 A1 | 1/2004 | Squier |
| 2004/0031798 A1 | 2/2004 | Fox |
| 2004/0038040 A1 | 2/2004 | Schumann |
| 2004/0052993 A1 | 3/2004 | Dawes |
| 2004/0063841 A1 | 4/2004 | Gilmer |
| 2004/0067284 A1 | 4/2004 | Sankey |
| 2004/0067294 A1 | 4/2004 | Pedrick |
| 2004/0081780 A1 | 4/2004 | Goldman |
| 2004/0097630 A1 | 5/2004 | Whitman |
| 2004/0106693 A1 | 6/2004 | Kauffman |
| 2004/0132906 A1 | 7/2004 | Guerin |
| 2004/0142193 A1 | 7/2004 | Husemann |
| 2004/0161178 A1 | 8/2004 | Olechowski |
| 2004/0180197 A1 | 9/2004 | Everaerts |
| 2004/0191438 A1 | 9/2004 | Cosentino |
| 2004/0208955 A1 | 10/2004 | Carr et al. |
| 2004/0219336 A1 | 11/2004 | Sano |
| 2004/0224069 A1 | 11/2004 | Aird et al. |
| 2004/0234175 A1 | 11/2004 | Takita |
| 2005/0019382 A1 | 1/2005 | Kummer |
| 2005/0031233 A1 | 2/2005 | Varanese |
| 2005/0041888 A1 | 2/2005 | Matsuzawa |
| 2005/0042468 A1 | 2/2005 | Peiffer |
| 2005/0063619 A1 | 3/2005 | Kinigakis |
| 2005/0074619 A1 | 4/2005 | Peiffer |
| 2005/0121822 A1 | 6/2005 | Peiffer |
| 2005/0137310 A1 | 6/2005 | Gupta |
| 2005/0170086 A1 | 8/2005 | Tynan |
| 2005/0182186 A1 | 8/2005 | Gielens |
| 2005/0196509 A1 | 9/2005 | Murphy |
| 2005/0202134 A1 | 9/2005 | Schroeder |
| 2005/0208282 A1 | 9/2005 | Wood |
| 2005/0209356 A1 | 9/2005 | Erickson |
| 2005/0214431 A1 | 9/2005 | Fitzsimons et al. |
| 2005/0217558 A1 | 10/2005 | Fitzer |
| 2005/0238783 A1 | 10/2005 | Han |
| 2005/0249903 A1 | 11/2005 | Kendig |
| 2005/0249906 A1 | 11/2005 | Sankey |
| 2005/0266257 A1 | 12/2005 | Lee |
| 2005/0266582 A1 | 12/2005 | Modlin |
| 2005/0276940 A1 | 12/2005 | Stevenson |
| 2005/0282942 A1 | 12/2005 | DSidocky |
| 2005/0282948 A1 | 12/2005 | Li |
| 2006/0029300 A1 | 2/2006 | Yoder |
| 2006/0046595 A1 | 3/2006 | Imaizumi |
| 2006/0057248 A1 | 3/2006 | Lincourt et al. |
| 2006/0062955 A1 | 3/2006 | Liu |
| 2006/0074167 A1 | 4/2006 | Nelson |
| 2006/0094810 A1 | 5/2006 | Kim |
| 2006/0094811 A1 | 5/2006 | Kim |
| 2006/0111499 A1 | 5/2006 | Kim |

(56) References Cited

U.S. PATENT DOCUMENTS

| | | |
|---|---|---|
| 2006/0121224 A1 | 6/2006 | Kim |
| 2006/0122311 A1 | 6/2006 | Kim |
| 2006/0122312 A1 | 6/2006 | Kim |
| 2006/0128867 A1 | 6/2006 | Marx |
| 2006/0141183 A1 | 6/2006 | Williamson |
| 2006/0141241 A1 | 6/2006 | Carespodi |
| 2006/0159804 A1 | 7/2006 | Bhaskar et al. |
| 2006/0172098 A1 | 8/2006 | Stevenson |
| 2006/0173124 A1 | 8/2006 | Paul |
| 2006/0199890 A1 | 9/2006 | Fasulo |
| 2006/0205916 A1 | 9/2006 | Takekoshi |
| 2006/0211804 A1 | 9/2006 | Kim |
| 2006/0222797 A1 | 10/2006 | Bekele |
| 2006/0228057 A1 | 10/2006 | Newrones |
| 2006/0234047 A1 | 10/2006 | Wenninger |
| 2006/0240204 A1 | 10/2006 | Ling |
| 2006/0240209 A1 | 10/2006 | Sano |
| 2006/0257640 A1 | 11/2006 | Schumann |
| 2006/0269707 A1 | 11/2006 | Berbert |
| 2006/0292378 A1 | 12/2006 | Mgaya |
| 2007/0017925 A1 | 1/2007 | Karr |
| 2007/0078212 A1 | 4/2007 | Kim |
| 2007/0082086 A1 | 4/2007 | Carr et al. |
| 2007/0104395 A1 | 5/2007 | Kinigakis |
| 2007/0116914 A1 | 5/2007 | Koike |
| 2007/0135563 A1 | 6/2007 | Simmons |
| 2007/0158023 A1 | 7/2007 | Miyake |
| 2007/0179254 A1 | 8/2007 | Wang |
| 2007/0196610 A1 | 8/2007 | ORourke |
| 2007/0199481 A1 | 8/2007 | Roelofs |
| 2007/0213464 A1 | 9/2007 | Zollner |
| 2007/0267737 A1 | 11/2007 | Chen |
| 2007/0282064 A1 | 12/2007 | Dollase |
| 2008/0081186 A1 | 4/2008 | Ellringmann |
| 2008/0118688 A1 | 5/2008 | Kinigakis |
| 2008/0131636 A1 | 6/2008 | Kinigakis |
| 2008/0151031 A1 | 6/2008 | Kobayashi |
| 2008/0152850 A1 | 6/2008 | Paterson |
| 2008/0159666 A1 | 7/2008 | Exner |
| 2008/0160293 A1 | 7/2008 | Arimitsu |
| 2008/0170814 A1 | 7/2008 | Bowers |
| 2008/0176980 A1 | 7/2008 | Torkelson |
| 2008/0206417 A1 | 8/2008 | Kirsch |
| 2008/0223007 A1 | 9/2008 | Friebe |
| 2008/0255296 A1 | 10/2008 | Gibbons |
| 2008/0262126 A1 | 10/2008 | Fleischer |
| 2008/0281038 A1 | 11/2008 | Takahashi |
| 2008/0317928 A1 | 12/2008 | Towler |
| 2009/0036580 A1 | 2/2009 | Qian |
| 2009/0043024 A1 | 2/2009 | Brunelle |
| 2009/0048398 A1 | 2/2009 | Zollner |
| 2009/0053388 A1 | 2/2009 | Powers |
| 2009/0053445 A1 | 2/2009 | Trent |
| 2009/0061137 A1 | 3/2009 | Konrad |
| 2009/0061138 A1 | 3/2009 | Peiffer |
| 2009/0068311 A1 | 3/2009 | Lucey et al. |
| 2009/0092730 A1 | 4/2009 | Smith et al. |
| 2009/0098327 A1 | 4/2009 | Buchbinder |
| 2009/0098375 A1 | 4/2009 | Voisin |
| 2009/0186220 A1 | 7/2009 | Palasz |
| 2009/0279813 A1 | 11/2009 | Pokusa |
| 2010/0092793 A1 | 4/2010 | Aithani |
| 2010/0178394 A1 | 7/2010 | Exner |
| 2010/0239721 A1 | 9/2010 | Stoppello |
| 2011/0068040 A1 | 3/2011 | Kendig |
| 2011/0143133 A1 | 6/2011 | Kinigakis |

FOREIGN PATENT DOCUMENTS

| | | |
|---|---|---|
| DE | 102005013585 | 9/2006 |
| EP | 0016292 A1 | 10/1980 |
| EP | 0290147 | 9/1988 |
| EP | 0338304 | 10/1989 |
| EP | 0340339 A2 | 11/1989 |
| EP | 0411191 A1 | 2/1991 |
| EP | 0427512 A1 | 5/1991 |
| EP | 0427513 A1 | 5/1991 |
| EP | 0439941 | 8/1991 |
| EP | 0516276 | 2/1992 |
| EP | 0512191 A2 | 11/1992 |
| EP | 0535728 | 4/1993 |
| EP | 0537951 A1 | 4/1993 |
| EP | 0539099 | 4/1993 |
| EP | 0542449 A1 | 5/1993 |
| EP | 0546383 A1 | 6/1993 |
| EP | 0627883 | 9/1993 |
| EP | 0602731 A2 | 6/1994 |
| EP | 0684970 | 12/1995 |
| EP | 0772553 | 5/1997 |
| EP | 0802044 | 10/1997 |
| EP | 0806138 A1 | 11/1997 |
| EP | 0848726 | 6/1998 |
| EP | 1010632 | 6/2000 |
| EP | 1010638 | 6/2000 |
| EP | 1080881 | 3/2001 |
| EP | 1144494 | 10/2001 |
| EP | 1164087 | 12/2001 |
| EP | 1177245 | 2/2002 |
| EP | 1232960 | 8/2002 |
| EP | 1281623 | 2/2003 |
| EP | 1288139 | 3/2003 |
| EP | 1344642 | 9/2003 |
| EP | 1356925 | 10/2003 |
| EP | 1460117 | 9/2004 |
| EP | 1475229 | 11/2004 |
| EP | 1496085 | 1/2005 |
| EP | 1527692 A1 | 5/2005 |
| EP | 1529799 | 5/2005 |
| EP | 1541480 | 6/2005 |
| EP | 1591236 | 11/2005 |
| EP | 1642914 | 5/2006 |
| EP | 1676785 | 7/2006 |
| EP | 1714895 | 10/2006 |
| EP | 1733640 | 12/2006 |
| EP | 1739024 | 1/2007 |
| EP | 1767111 A2 | 3/2007 |
| EP | 1785447 | 5/2007 |
| EP | 1842792 A1 | 10/2007 |
| EP | 1905584 | 2/2008 |
| EP | 2042139 A2 | 4/2009 |
| EP | 2045304 A2 | 4/2009 |
| EP | 2090600 | 8/2009 |
| EP | 2319765 | 5/2011 |
| FR | 2150897 | 5/1973 |
| FR | 2769867 | 4/1999 |
| FR | 2783512 | 3/2000 |
| GB | 1423548 | 2/1976 |
| GB | 2237178 A | 5/1991 |
| GB | 2339187 | 1/2000 |
| JP | 59018774 | 1/1984 |
| JP | 61158746 A | 7/1986 |
| JP | 62285755 A | 12/1987 |
| JP | 63024848 | 2/1988 |
| JP | 63129951 A | 6/1988 |
| JP | 01013948 A | 1/1989 |
| JP | 64013948 A | 1/1989 |
| JP | 01218548 A | 8/1989 |
| JP | 05221454 | 8/1993 |
| JP | 05276865 | 10/1993 |
| JP | 6072078 | 3/1994 |
| JP | 07143845 | 6/1995 |
| JP | 10146931 | 6/1998 |
| JP | 11035907 | 2/1999 |
| JP | 11221014 A | 8/1999 |
| JP | 11332462 A | 12/1999 |
| JP | 2000198170 | 7/2000 |
| JP | 200395285 | 4/2003 |
| JP | 2003095285 | 4/2003 |
| JP | 2003259804 | 6/2003 |
| JP | 03259804 A | 9/2003 |
| JP | 2005041544 | 2/2005 |
| JP | 3894912 B2 | 3/2005 |
| JP | 2005280736 | 10/2005 |
| JP | 2006315385 | 11/2006 |

(56) References Cited

FOREIGN PATENT DOCUMENTS

| | | |
|---|---|---|
| RU | 2237689 | 10/2004 |
| RU | 2244668 | 1/2005 |
| WO | 9516743 | 6/1995 |
| WO | 9518539 A1 | 7/1995 |
| WO | 9604178 | 2/1996 |
| WO | 9742258 | 11/1997 |
| WO | 9748554 | 12/1997 |
| WO | 9800471 | 1/1998 |
| WO | 9952972 | 10/1999 |
| WO | 0027214 A1 | 5/2000 |
| WO | 0034372 | 6/2000 |
| WO | 0039200 | 7/2000 |
| WO | 0058167 | 10/2000 |
| WO | 0141578 | 6/2001 |
| WO | 0187566 | 11/2001 |
| WO | 0222729 | 3/2002 |
| WO | 0226579 | 4/2002 |
| WO | 0296208 | 5/2002 |
| WO | 03011961 | 2/2003 |
| WO | 03035391 | 5/2003 |
| WO | 03040199 | 5/2003 |
| WO | 03075668 A1 | 9/2003 |
| WO | 03091020 | 11/2003 |
| WO | 2004057971 | 7/2004 |
| WO | 2004080808 | 9/2004 |
| WO | 2005005276 | 1/2005 |
| WO | 2005014406 | 2/2005 |
| WO | 2005040268 | 5/2005 |
| WO | 2005056644 | 6/2005 |
| WO | 2005110885 A2 | 11/2005 |
| WO | 2005116132 | 12/2005 |
| WO | 2006009360 | 1/2006 |
| WO | 2006045896 | 5/2006 |
| WO | 2006058952 | 6/2006 |
| WO | 2006071833 | 7/2006 |
| WO | 2006100084 | 9/2006 |
| WO | 2006111177 | 10/2006 |
| WO | 2007009200 | 1/2007 |
| WO | 2007012805 | 2/2007 |
| WO | 2007019142 | 2/2007 |
| WO | 2007026053 A1 | 3/2007 |
| WO | 2007027423 | 3/2007 |
| WO | 2007090265 | 8/2007 |
| WO | 2007093798 | 8/2007 |
| WO | 2007106671 | 9/2007 |
| WO | 2007115310 | 10/2007 |
| WO | 2007121048 | 10/2007 |
| WO | 2007121049 | 10/2007 |
| WO | 2007123582 | 11/2007 |
| WO | 2007130755 | 11/2007 |
| WO | 2007146390 | 12/2007 |
| WO | 2008026940 A1 | 3/2008 |
| WO | 2008043750 | 4/2008 |
| WO | 2008053205 | 5/2008 |
| WO | 2008115693 | 9/2008 |
| WO | 2008122094 A1 | 10/2008 |
| WO | 2008127485 | 10/2008 |
| WO | 2010088492 | 8/2010 |
| ZW | 2894 | 5/1994 |

OTHER PUBLICATIONS

European Patent Office Extended European Search Report and Written Opinion, dated Apr. 4, 2011; EP Application No. 11156091.8.
European Patent Office Extended European Search Report and Written Opinion, dated Apr. 4, 2011; EP Application No. 11156092.6.
European Patent Office Extended European Search Report and Written Opinion, dated Apr. 4, 2011; EP Application No. 11156093.4.
European Search Report issued on Oct. 17, 2012 in European Patent Application EP06122144.6.
European Search Report issued on Oct. 18, 2012 in European Patent Application EP10184281.3.
European Search Report issued on Oct. 18, 2012 in European Patent Application EP10184331.6.
Kuusipalo, J.; Re-sealing Studies of Cold Seal Latexes for Paper Based Packages; Finnish Paper and Wood Journal Lid., 2000, vol. 82, No. 3, pp. 189-192.
Notice of Opposition filed by Opponent BASF in the European Patent Office; EP Patent No. 1939106; dated Dec. 8, 2009.
Notice of Opposition filed by Opponent Cadbury in the European Patent Office; EP Patent No. 1939106; dated Dec. 3, 2009.
Notice of Opposition filed by Opponent Ritter in the European Patent Office; EP Patent No. 1939106; dated Nov. 26, 2009.
PCT International Search Report, dated Mar. 25, 2009; PCT/US2009/33677.
Response to Notice of Opposition, dated Jul. 21, 2010; EP Patent No. 1939106.
The International Bureau of WIPO, Notification Concerning Transmittal of International Preliminary Report on Patentability (Chapter 1 of the Patent Cooperation Treaty) for International Application No. PCT/US2009/042998 dated Nov. 18, 2010.
EP Search Report—EP 018159303.
Bowland, Rheological and Microstructural Analyses of Model Processed Cheese, A dissertation submitted to the Graduate Faculty of North Carolina Stat University, Food Science, 1997, pp. 45, 60 61, 145, and 146.
Saunders, Terri L. "The Case of Raw Milk" Jan. 15, 2006 http://web.archive.org/web/20060115051108/http://www.sunherb.corn/RawMilk.htm.
Declaration of Dr. Jennifer Kimmel Under 37 C.F.R. § 1.132, dated Jan. 21, 2013, and tiled in U.S. Appl. No. 12/143,990 (3 pgs).
Declaration of Gary F. Smith Under 37 C.F.R. § 1.132, dated Mar. 4, 2014, and filed in U.S. Appl. No. 12/143,990 (7 pgs).

* cited by examiner

PROCESSED CHEESE WITHOUT EMULSIFYING SALTS

RELATED APPLICATION

This application is a divisional of, and claims priority to U.S. application Ser. No. 12/143,990, filed Jun. 23, 2008, which in turn is based on, and claims benefit of, U.S. Provisional Application Ser. No. 61/007,506 with an effective date of Jun. 29, 2007, as well as U.S. patent application Ser. No. 11/771,225, filed on Jun. 29, 2007, which was requested to be converted to the Provisional Application Ser. No. 61/007,506 on Jun. 19, 2008, under 35 U.S.C. §153(b)(2), all of which applications are hereby incorporated by reference.

FIELD OF THE INVENTION

The present invention is directed to process cheese prepared without significant levels of emulsifying salts and methods of producing such process cheese without significant levels of emulsifying salts. The cheese of the present invention is advantageously resistant to separation during and after heating and retains desirable organoleptic properties, such as texture, without the use of emulsifying salts.

BACKGROUND OF THE INVENTION

In the early 1900's, James L. Kraft patented a method of making process cheese which had distinct technical advantages over natural cheese. Namely, process cheese has an extended shelf-life in comparison to natural cheese, is resistant to separation when cooked, and can be formed into a wide variety of product forms (e.g., slices, loaves, sauces, dips, and the like). Process cheese is produced by comminuting and mixing together natural cheese, other dairy ingredients, emulsifiers, salt, and optionally food colorings. Various types of natural cheese as well as blends thereof may be used to provide consumer preferred flavor profiles. Pasteurized process cheese is heated to at least 150° F. for at least 30 seconds.

Despite the technical advantages over natural cheese, it would be desirable to provide process chesses having improved attributes which would appeal to larger numbers of consumers. For example, some consumers may perceive the emulsifying salts as "chemicals" and prefer products containing more natural ingredients. Emulsifying salts also tend to modify the desired flavor of the natural cheeses by providing a milder and saltier flavor profile; some consumers may prefer a more natural and intense cheese flavor profile in a process cheese. In addition, processed cheese generally contains higher levels of sodium than natural cheese since processed cheese contains sodium based emulsifying salts as well as sodium chloride.

Process cheese is prepared by blending cheese, emulsifying salts, and other ingredients under conditions of heat and shear. Emulsifying salts are useful for creating a cheese that melts smoothly when cooked, as opposed to separating into different phases. The most common emulsifying salts are sodium and potassium citrates, monophosphates, and polyphosphates. Emulsifying salts complex with calcium ions in the cheese to solubilize the protein, increase protein hydration and swelling, to facilitate emulsification of fat, and to adjust and stabilize pH. Emulsifying salts reduce the tendency for fat globules in the cheese to coalesce and pool on the surface of the molten cheese. Emulsifying salts allow a cheesemaker to pasteurize the cheese product without deterioration of the cheese texture.

Prior attempts to produce a process cheese without emulsifying salts have generally been problematic. For example, European Patent Application 0016292 provides a process for preparing process cheese wherein ion exchange is effected using an ion exchange column; this approach is extremely cumbersome in manufacturing practice and would be extremely costly in terms of capital equipment and operating costs. "Pasteurized blended cheese" (as defined in 21 C.F.R. 133.167) identifies a good tasting smooth pasteurized cheese product without emulsifying salts. Manufacturers do not, however, generally offer such "pasteurized blended cheese" products because of high cost (i.e., generally requires over 90% natural cheese) and its lack of manufacturing robustness (i.e., the emulsion easily separates or breaks at temperatures above 157° F., making it difficult to pasteurize on a consistent basis). European Patent Application 0535728 also provides a method of heating an unpasteurized cheese blend comprising 30 to 90 percent unripened cheese and a protein source to 35 to 65° C. (i.e., approximately 95 to 149° F.). Since the heating step is carried out below pasteurization temperatures, the resulting cheese is not pasteurized.

Thus, although process cheese has a number of beneficial qualities there is a desire to produce a cheese product that maintains beneficial qualities including extended shelf-life and resistance to separation during heating, but without the addition of certain additives, such as emulsifying salts. There is an additional desire to decrease the amount of added sodium in process cheese and further, to improve the quality of the natural cheese flavor in the product at a modest cost.

SUMMARY OF THE INVENTION

Described herein is a process cheese-type product comprising natural cheese and a calcium reduced casein source, wherein the process cheese-type product does not contain significant levels of emulsifying salts. Generally, the process cheese-type product contains natural cheese with about 2.5 to 25 percent (solid basis) calcium reduced casein source. Generally the process cheese-type products of this invention will have an overall moisture level of about 35 to 60 percent. Preferably, the cheese product comprises natural cheese in the range of about 20 to about 87 percent, a source of whey protein in the range of about 0 to about 20 percent (solid basis), and a calcium reduced casein source in the range of about 0.8 to about 25 percent (solid basis). More preferably, the cheese product comprises natural cheese in the range of about 20 to about 60 percent, a source of whey protein in the range of about 0 to about 15 percent (solid basis), and a calcium reduced casein source in the range of about 2.5 to about 20 percent (solid basis). Even more preferably, the cheese product comprises natural cheese in the range of about 30 to about 50 percent, a source of whey protein in the range of about 0 to about 15 percent (solid basis), and a calcium reduced casein source in the range of about 5 to about 20 percent (solid basis). The relative amounts of natural cheese and water will vary depending on the type of cheese product desired. For example, cheese slice-type products will generally have higher levels of natural cheese and lower moisture contents as compared to cheese spread-type products (generally, lower levels of natural cheese and higher levels of moisture). For purposes of this invention, "significant levels" of emulsifying salts are generally above about 0.5 percent. Thus, the cheese products of the present invention contain less than about 0.5 percent emulsifying salts, preferably less than about 0.2 percent emulsifying salts, and more preferably no added emulsifying salts.

For purposes of this invention, the calcium reduced casein source should have less than about 350 ppm calcium per percent casein, preferably less than about 200 ppm calcium per percent casein, and more preferably less than about 175 ppm calcium per percent casein. The calcium reduced casein source may range from a liquid to a powder. For example, one commercially available calcium reduced casein source is Nutrilac CH-7813 from Arla Foods (a powder which contains about 61.5 percent casein and has a calcium level of about 10,400 ppm); it contains about 170 ppm calcium per percent casein. Calcium reduced liquids such as prepared in Example 3 can also be used. This calcium reduced skim milk liquid has a moisture level of about 82.8 percent, a casein level of about 10.4 percent, and a calcium level about 1,440 ppm. Thus, it contains about 139 ppm calcium per percent casein.

Generally, the process cheese products of this invention have less than about 325 mg sodium/oz, preferably less than about 270 mg sodium/oz, and more preferably less than about 240 mg sodium/oz, while maintaining perceived saltiness at levels normally associated with process cheese.

In one embodiment, the cheese product can be heated up to 160° F. to form a homogenous blend without substantial separation. In another embodiment, the cheese product can be heated up to 190° F. to form a homogenous blend without substantial separation. In yet another embodiment, the cheese product is pasteurized.

Other than significant levels of emulsifying salts, the cheese product described herein may contain additional ingredients so long as they do not adversely affect the properties of the resulting process cheese. Examples of such additives include, but are not limited to colorants, flavorants, preservatives, other milk components, and the like. For example, in one embodiment, the cheese product may contain milk fat in levels up to about 15 percent to achieve the desired fat targets in the finished product. In another embodiment, the cheese product contains added sodium chloride. In yet another embodiment, the cheese product contains sorbic acid.

In one embodiment, the cheese product described herein may be any of a cheese dip, a cheese spread, a cheese block, a cheese slice, a shredded cheese, or the like.

In one embodiment, the calcium reduced casein source contained in the cheese described herein may be produced using ultrafiltration, diafiltration, cation exchange, acidification, dialysis, chelation, as well as similar techniques and combinations thereof. One preferred calcium reduced casein source can be obtained using ultrafiltration alone or in combination with diafiltration.

Also described herein is a cheese product comprising natural cheese in the range of about 20 to about 87 percent, a source of whey protein in the range of about 0 to about 20 percent (solid basis), a calcium reduced casein source in the range of about 0.8 to about 25 percent (solid basis), and overall moisture in the range of about 35 to 70 wherein the cheese product can be heated to 160° F. without substantial separation. Overall moisture is the moisture content of the final cheese product and includes moisture added via the individual ingredients as well as any water added to the composition (either directly or as condensate).

Also described herein is a method of making a cheese product comprising blending together (1) natural cheese in the range of about 20 to 87 percent, (2) a source of whey protein in the range of about 0 to about 20 percent (solid basis), and (3) a calcium reduced casein source in the range of about 0.8 to about 25 percent (solid basis) to form a mixture; cooking the mixture in a process cheese cooker to a temperature of at least about 160° F., wherein the cheese product does not contain emulsifying salts.

Also described herein is a method of making a cheese product comprising blending together (1) natural cheese in the range of about 20 to 87 percent, (2) a source of whey protein in the range of about 0 to about 20 percent (solid basis), and (3) a calcium reduced casein source in the range of about 0.8 to about 25 percent (solid basis) to form a mixture; heating the mixture in a process cheese cooker to a temperature of at least 160° F. for a time sufficient to provide a homogenous mixture as the cheese product, wherein the cheese product can be heated to 160° F. without separation.

DETAILED DESCRIPTION OF THE INVENTION

The present invention addresses the need for a process cheese that is resistant to separation during heating and retains desirable organoleptic properties, such as smooth texture, more intense cheese flavor, and reduced sodium levels (relative to conventional process cheese) without the use of conventional emulsifying salts.

There are numerous advantages to the present invention. For example, the process described herein yields cheese products having desirable organoleptic properties such as good meltability, smooth texture, and a wide spectrum of possible cheese flavors, including natural cheese flavors, which has been unattainable by prior methods of making process cheese without the addition of emulsifying salts or only with excessive costs. The cheese products of the present invention are more natural than the process cheeses of the prior art because they may be produced without the addition of emulsifiers, which are necessary to prevent separation during heating in traditional processed cheese products. Furthermore, the cheese products described herein are resistant to separation at typical process cheese shear rates and process cheese manufacturing temperatures. The cheese products of the present invention are more healthy than the process cheese of the prior art since they have reduced sodium content with the same perceived saltiness as traditional process cheese.

Generally, the pasteurized process cheese of the present invention may be produced by blending together natural cheese or mixture of natural cheeses (preferably ground using a conventional cheese grinder), moisture, and a calcium reduced casein source. Sodium chloride may be added for flavor. Sorbic acid may be added as an anti-microbial agent. Other optional ingredients may be added to improve texture, flavor, nutrition, and/or cost attributes. These include, but are not limited to, whey derived ingredients (e.g., whey protein concentrate), non-fat dry milk, milk protein concentrate, anhydrous milk fat, gums, starches, gelatin, and the like. Emulsifying salts are not added to the blend. Next, the ingredients are blended together and then heated to pasteurization temperatures. Optionally, shear may be applied during or after the heating. The resulting cheese product is generally homogenous, shows no signs of separation (i.e., "watering off" and/or protein sedimentation) at pasteurization temperatures, and has significantly lower sodium content than typical process cheese (but with the same perceived saltiness by taste). Typically, the process cheeses of this invention have less than about 180 mg sodium as compared to about 270 mg sodium per 0.75 oz serving for conventional process cheeses prepared using emulsifying salts; thus, the sodium reduction provided by the present invention is about 30 percent or more as compared to conventional process cheeses (some of which may have even higher levels of sodium due to higher emulsifying salt usage). The cheeses of this invention can also have a stronger aged cheese flavor than typical process cheeses prepared using emulsifying salts; in other words, the process cheeses of this invention will more closely approach the flavor profile of the natural cheeses from which they are prepared as compared to similar, but conventionally prepared, process cheeses prepared using emulsifying salts which are currently available. The shelf lives of the cheeses of this invention appear to be similar to that of conventional process cheeses prepared with emulsifying salts.

In one embodiment, the cheese product of the present invention comprises a natural cheese or a blend of natural cheese in the range of about 20 to about 87 percent (preferably ground using a conventional cheese grinder), a source of whey protein in the range of about 0 to 20 percent (solid basis), anhydrous milk fat in the range of 0 to about 15 percent, a calcium reduced casein source in the range of 0.8 to 20 percent (solid basis), overall moisture in the range of 35 to about 70 percent, sorbic acid in the range of 0 to about 0.20 percent, and added sodium chloride in the range of 0 to about 1.7 percent. In another embodiment, the cheese product of the present invention comprises a natural cheese or a blend of natural cheese in the range of about 40 to about 60 percent, a source of whey protein in the range of about 5 to 20 percent (solid basis), anhydrous milk fat in the range of about 5 to about 15 percent, a calcium reduced casein source in the range of 3 to 15 percent (solid basis), overall moisture in the range of 40 to about 55 percent, sorbic acid in the range of 0.10 to about 0.20 percent, and added sodium chloride in the range of 0.25 to about 1.5 percent.

As is known by one of ordinary skill in the art, the ingredients may be used in varying amounts depending on the desired outcome of the cheese product. For example, for a reduced sodium cheese product, a cheesemaker may include a small amount or no salt in the cheese blend.

Natural cheese refers to unpasteurized cheese made by curdling milk using some combination of rennet (or rennet substitutes) and acidification. The natural cheese used in the present invention may be freshly made or aged.

Whey protein refers to a collection of globular proteins that can be isolated from whey, which is the liquid remaining after milk has been curdled and strained. Whey protein is typically a mixture of beta-lactoglobulin, alpha-lactalbumin, and serum albumin proteins. In one embodiment, whey protein concentrate (WPC) may be used as the whey protein source. WPC is derived from whey by conventional concentration techniques. The whey protein source may also include lactose, vitamins, minerals, and fat.

Moisture may be added to the blend by any method, such as, but not limited to, injecting steam into the cooker (e.g., a laydown cooker), commingling of condensed steam from cooking, and/or direct addition of water. Of course, moisture can also enter into the system through the various ingredients (e.g., moisture from the natural cheese). Overall moisture of the final cheese products includes all moisture independent of how the moisture was introduced into the final product.

Casein is the general name for the dominant class of proteins present in milk, and is essentially the protein left in cheese after the whey (including the whey protein) has been drained off. Most types of casein have calcium phosphate groups. The higher the level of calcium, the less soluble the casein. One of the most important functions of process cheese emulsifying salts is to bind the calcium, increasing the solubility of the casein and enabling the casein to emulsify the blend. While not wishing to be limited by theory, it is thought that at least in part, the calcium reduced casein source which has a high solubility, compensates for the low solubility in the conventionally made natural cheese so that when the two are blended, mixed, and heated, the resulting blend has sufficient solubility at a microscopic level for a stable emulsion. The finished product is sufficiently soluble as to resemble process cheese in terms of smoothness and homogeneity in the cooking process and finished product. Further steps such as homogenization tend to create even better mixing at a microscopic level, and result in enhanced smoothness, creaminess, and stability of the emulsion.

The calcium reduced casein used in the present invention may be produced by any known means. Methods for producing calcium reduced casein are described in U.S. Patent Publication No. 2003/0054068 of Dybing et al. and WO 01/041578 of Bhaskar, both of which are hereby incorporated by reference. Preferably the calcium reduced casein used in this invention is produced by ultrafiltration alone or in combination with diafiltration. Commercially available calcium reduced casein (e.g., Nutrilac CH-7813 from Arla Foods) may also be used.

Dybing et al. provides a calcium reduced milk protein concentrate produced by running the milk protein concentrate through a cation exchanger containing monovalent cations. The divalent calcium ions are exchanged for monovalent cations, such as hydrogen, potassium, or sodium.

Bhaskar provides a calcium reduced milk protein concentrate produced by use of a cation exchanger, acidification and dialysis, or chelation. In those embodiments in which calcium removal is by acidification and subsequent dialysis, ultrafiltration, or diafiltration, the pH of the milk protein concentrate is adjusted to be in the range of 4.8 to 5.5 and passed through a membrane having a nominal molecular weight cut off of 10,000 Daltons or less. When the calcium removal is by way of addition of a chelating agent, preferred chelating agents for use include citric acid, ethylenediaminetetraacetic acid (EDTA), food phosphates/polyphosphates, food acidulants, tartaric acid, citrates and tartrates.

EXAMPLES

A better understanding of the present embodiment and its many advantages may be clarified with the following examples, given by way of illustration.

Example 1

A cheese product was produced by blending together 36.2 percent natural cheddar cheese (moderately aged), 30.6 percent added water (including condensed steam from injecting steam into a batch cooker), 14.9 percent WPC34 (whey protein concentrate with about 34 percent protein used as filler), 9.0 percent calcium reduced milk protein concentrate (Nutrilac CH-7813 from Arla Foods; powder containing about 61.5 percent casein and about 10,400 ppm calcium; 169 ppm calcium per percent casein), 8.6 percent anhydrous milk fat, 0.5 percent salt, and 0.17 percent sorbic acid. No emulsifying salts were added. After the ingredients were blended together, the blend was heated to 165° F. over about 5 minutes using injected steam in a laydown cooker; a first sample was taken. Next, the blend was heated to 190°

F. over about 3 minutes by further injection of steam; a second sample was taken. The overall moisture content was about 44 percent.

Both the first and second samples were homogenous and showed no signs of separation. They were firm in texture, similar to a process loaf product. Organoleptically, the products were creamy and smooth with a strong cheddar flavor (generally much more intense in cheese flavor than conventional process cheese with the same basic composition). Additionally, the samples had significantly lower sodium content (about 163 mg sodium/ounce) than typical process cheese; this represents about a 60 percent reduction in sodium as compared to conventional process cheese. When these samples are remelted, they flowed evenly and had a smooth consistency. Under refrigeration conditions, these samples had shelf lives of at least 9 months.

Example 2

A cheese product was produced by blending together 28.4 percent aged natural cheddar cheese, 39.5 percent added water (including condensed steam from injecting steam into a batch cooker), 14.9 percent WPC34, 5.0 percent calcium reduced milk protein concentrate (Nutrilac CH-7813 from Arla Foods), 11.4 percent anhydrous milk fat, 0.7 percent salt, and 0.17 percent sorbic acid. No emulsifying salts were added. After the ingredients were blended together, the blend was heated to 165° F. over about 5 minutes in a batch style steam injection cooker and a first sample was taken. Next, the blend was heated to 181° F. over about 3 minutes with further steam injection and a second sample was taken.

Both first and second samples were homogeneous and smooth, had a strong cheese flavor, and were soft and dippable in texture. Both samples were low in sodium (about 163 mg sodium/ounce) and had similar shelf lives as the products from Example 1. Overall moisture content was about 50 percent.

Example 3

A calcium reduced skim milk preparation was produced using pasteurized cow skim milk (pH adjusted from 6.6 to 5.5 using food grade 5N HCl). The resulting milk was then concentrated using ultrafiltration and diafiltration to about 3 times the original concentration. The dilfiltration water used was also acidified to approximately pH 5.35. The resulting concentrated skim milk had a reduced calcium level (about 170 ppm calcium per percent casein) with about 82.8 percent moisture, about 10.4 percent casein, about 2.4 percent lactose, and about 1820 ppm calcium.

A cheese blend was prepared with 40 parts calcium reduced condensed skim milk, 41 parts aged cheddar cheese, 8.25 parts anhydrous milk fat, 1.35 parts sodium chloride, and 0.4 parts added water. The blend was mixed in a standard ribbon blender for about 12 minutes. The blend was then heated in a laydown process cheese cooker to 175° F. using steam injection; about 9 additional parts of water were added due to steam condensation. Then the product was homogenized in a two stage homogenizer (about 2500 psi total/500 psi second stage). The finished product contained about 56.7 percent overall moisture, about 22.9 percent fat, and about 2.2 percent sodium chloride.

The product was extremely creamy and smooth, had a strong cheddar cheese flavor and was white in color. The product was soft like a dip, and could be cleanly cut with a spoon. The product had a sodium level of about 237 mg per ounce of product, which is about 46 percent lower than the sodium level of a typical process cheese dip product. When the product was later re-melted, it flowed but remained emulsified and smooth. The homogenized product was smoother, creamier, firmer, and whiter than the unhomogenized product.

Example 4

A blend was prepared with 25 parts aged natural cheddar cheese, 24.9 parts 1.5 month old cheddar cheese, 25 parts calcium reduced condensed skim milk as prepared in Example 3, 5 parts calcium reduced milk protein concentrate (Nutrilac CH-7813), 3 parts whey protein concentrate (34 percent protein), 6.3 parts anhydrous milkfat, 1.15 parts sodium chloride, 0.25 parts xanthan gum, 0.25 parts locust bean gum, and 0.17 parts sorbic acid. These ingredients were blended together in a standard ribbon blender for approximately 12 minutes, then cooked in a standard process cheese laydown cooker to 175° F. as in Example 3; approximately 6 to 9 percent water was added as steam condensate in the cooker. A first sample was directly packaged in a hotpack slice format. A second sample was homogenized in two stage homogenizer (about 2500 psi total/500 psi second stage) and then packaged in a hotpack slice format. The final product has an overall moisture content of about 47 percent.

The first sample (i.e., unhomogenized sliced sample) was homogeneous, firm, and smooth. It separated easily from wrappers used to keep slices separated. It had a slight yellow hue. Protein had aligned in the direction of flow so that the slice had an almost string cheese like tear in the direction of original flow into the wrapper, but resisted tear in the transverse direction. Product had a strong cheese flavor and was low in sodium (about 237 mg/ounce of product). The second sample (i.e., homogenized product) was whiter in appearance, had excellent cheese flavor, and peeled extremely well from the wrappers. There was less protein alignment and the product tears equally well in either direction.

Example 5

Using essentially the same procedure as described in Example 4 above, cheese products containing high levels of natural cheese (i.e., about 75 to about 87 percent) were prepared using the following formulations:

| Sample 1 | |
|---|---|
| Cheddar (mild) | 38% |
| Cheddar (aged) | 40% |
| Cream Cheese | 9% |
| Nutrilac CH-7813 | 2% |
| Salt | 0.7% |
| Sorbic Acid | 0.2% |
| Added Water (including steam condensate) | 10% |
| Sample 2 | |
| Cheddar (sharp, 2% milk) | 27% |
| Cheddar (mild, low fat)) | 35% |
| Cheddar (aged, full fat) | 21% |
| Nutrilac CH-7813 | 1% |
| Salt | 0.7% |
| Sorbic Acid | 0.2% |
| Added Water (including steam condensate) | 15% |

Sample 1 contained about 87 percent conventionally prepared natural cheese; Sample 2 contained about 83 percent conventionally prepared natural cheese. Both samples produced cheese products in the form of blocks which were sufficiently firm to be suitable for slicing; products were slightly elastic and had good cheddar flavor, similar to conventionally made cheddar cheese. Total moisture was about 43 and 50 percent, respectively, for Samples 1 and 2.

All references (including publications, patents, patent publications, and patent applications) cited herein are incorporated by reference. All percentages throughout this specification are by weight percent unless otherwise specified.

What is claimed is:

1. A method of making a process cheese product, the method comprising:
   forming a mixture comprising (1) about 20 to about 87 percent of a natural cheese or mixture of natural cheeses, and (2) about 0.8 to about 25 percent (solid basis) of a calcium reduced casein source in a cooker;
   heating the formed mixture to 160° F. by the injection of steam into the formed mixture until a homogenous mixture is formed to produce the process cheese product,
   wherein the produced process cheese product is homogenous and contains less than about 350 mg sodium per ounce and does not contain significant levels of emulsifying salts.

2. The method of claim 1, further comprising heating the produced process cheese product to 160° F. without substantial separation.

3. The method of claim 1, further comprising heating the produced process cheese product to 190° F. without substantial separation.

4. The method of claim 1, further comprising pasteurizing the produced process cheese product.

5. The method of claim 1, wherein the mixture further comprises at least one ingredient from the group consisting of anhydrous milk fat, whey protein, sodium chloride, and sorbic acid.

6. The method of claim 1, wherein the cheese product is any of the group consisting of a cheese dip, a cheese spread, a cheese block, a cheese slice, and a shredded cheese.

7. The method of claim 1, wherein the calcium reduced casein source is produced by a process selected from the group consisting of ultrafiltration, diafiltration, cation exchange, acidification, dialysis, and chelation.

8. The method of claim 1, wherein the mixture further comprises a source of whey protein in a range of 0 to about 20 percent (solid basis).

9. The method of claim 8, wherein the natural cheese or mixture of natural cheeses is in the range of about 30 to about 60 percent, the source of whey protein is in the range of 0 to about 15 percent (solid basis), and the calcium reduced casein source is in the range of about 2.5 to about 20 percent (solid basis).

10. The method of claim 1, wherein the calcium reduced casein source provides an amount of calcium reduced casein having calcium but not more than about 350 ppm calcium per percent of casein.

11. The method of claim 10, wherein the calcium reduced casein has less than about 200 ppm of calcium per percent of casein.

12. The method of claim 11, wherein the calcium reduced casein has less than about 175 ppm of calcium per percent of casein.

13. The method of claim 1, wherein the produced process cheese product contains about 0.8 to about 25% (solid basis) calcium reduced casein source.

14. The method of claim 1, wherein the produced process cheese product contains less than about 0.5% emulsifying salts.

* * * * *